May 21, 1963  G. D. PAGE  3,090,394
PRESSURE CONTROL VALVES OF THE CENTRIFUGAL TYPE
Filed July 6, 1960
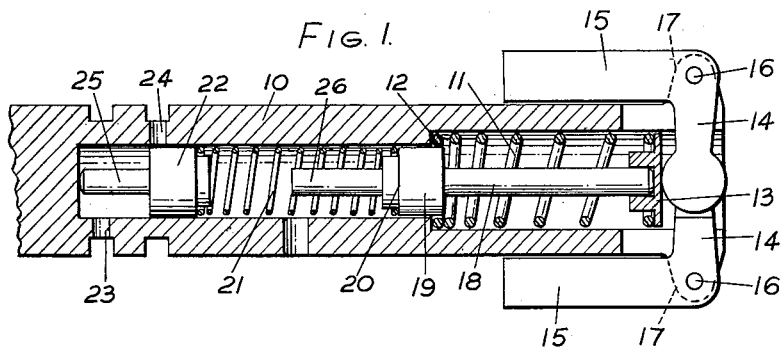
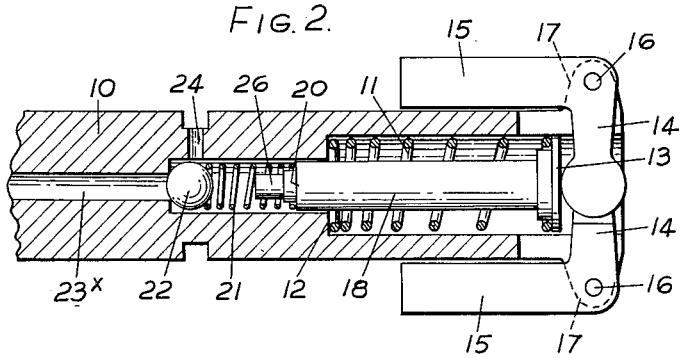
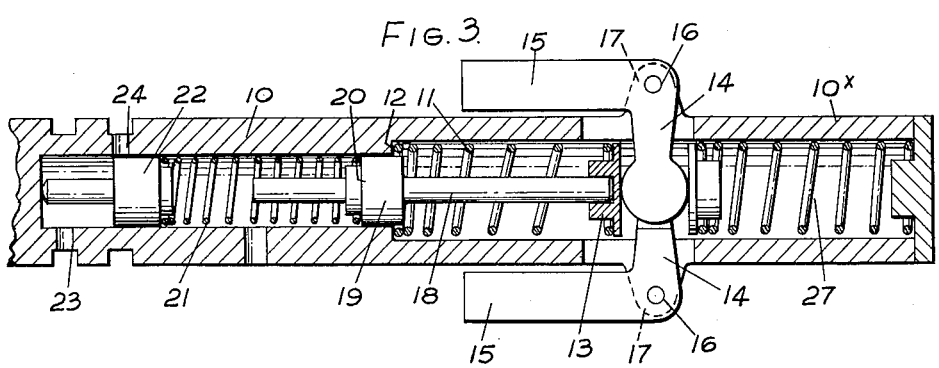
Inventor
Graham Desborough Page
By
Scrivener & Parker
Attorneys

3,090,394
PRESSURE CONTROL VALVES OF THE CENTRIFUGAL TYPE

Graham D. Page, Moseley, Birmingham, England, assignor to The Austin Motor Company Limited, Birmingham, England
Filed July 6, 1960, Ser. No. 41,062
Claims priority, application Great Britain July 8, 1959
5 Claims. (Cl. 137—56)

This invention relates to valves of the centrifugal type for controlling the pressure of fluid in a supply line in accordance with variations in the rotational speed of said valve.

More particularly the present invention has for its primary object the provision of a centrifugal type valve for controlling the actuating fluid pressure supplied to a by-pass valve connected across the pressure and return lines inter-connecting the engine driven pump and the driving motor of a hydrostatic transmission gear for a motor car or other powered vehicle, said centrifugal type valve being operative over the full starting range of engine speed with a view to ensuring smooth and gradual take-up of the vehicle drive. In vehicle applications of this kind as hitherto proposed, a conventional centrifugal valve driven according to engine speed has been employed to control the by-pass valve of the hydrostatic transmission system, but this arrangement is not entirely satisfactory since the centrifugal valve has a quadratic characteristic (the controlled fluid pressure being varied proportionally to the square of the rotational speed) and, in consequence, the increase in the controlled pressure is too rapid and causes the by-pass valve to be actuated too quickly to give a smooth and gradual take-up of the vehicle drive. Obviously, however, the invention may have other applications.

A centrifugal type valve of the kind referred to and according to the present invention is characterized in that one or more rotating governor weights act upon a spring of variable rate such that its deflection, due to the centrifugal force on said weight or weights, is proportional to the rotational speed of the latter, and in that said rotating governor weight or weights, or a member having an operative connection therewith, acts upon a second spring which applies a resulting force to the pressure control element of the valve.

The arrangement is such as to give a linear or near linear characteristic so that, as applied to the control of a by-pass valve in a vehicle hydrostatic transmission of the kind above referred to, the centrifugal valve will give a linear or near linear rise in the control pressure over the starting speed range and so ensure a more gradual movement of the by-pass valve, and consequently a smoother engagement of the vehicle drive, than is attainable with a conventional centrifugal valve having a quadratic characteristic.

The pressure control element of the valve is preferably of the ball or piston type and the first mentioned or variable rate spring is preferably much heavier than said second spring which applies the resulting force to said control element, whilst the said second spring may be of constant or variable rate to suit the specific requirements. In the latter connection, it will be appreciated that if the second spring has a rate which is small as compared with that of the first, loads on said second spring will have little effect on the deflection of said first spring, and that if the second spring is of constant rate, then the deflection of the first spring, which is proportional to speed, will deflect the second spring an amount which is also proportional to speed and thus cause the pressure control element of the valve to be subject to loading which is proportional to speed so that the controlled fluid pressure of the supply will also be proportional to speed.

Variation of the rates of both springs allows considerable scope in selection of the pressure-speed characteristic of the centrifugal type valve, and whilst a linear characteristic may be produced as described, it should also be possible to obtain a characteristic such that the rate of increase of the controlled pressure decreases gradually with increasing speed over the range for which the valve is designed.

Also it will be appreciated that it is only convenient to design for a particular pressure characteristic over a limited range of speeds. For example, where a linear characteristic is required over a speed range of 2:1 (say 500 to 1000 r.p.m.), the change in force due to the governor weights over this range will be a little over 4:1 (or 4:1 exactly if the weights did not have radial outward movement) so that at 1000 r.p.m. the spring rate requires to be more than four times greater than at 500 r.p.m., that is to say there must be more than four times as many active coils in the variable rate spring at 500 r.p.m., than there are at 1000 r.p.m. As it is difficult to make variable rate springs in which the number of active coils varies by a ratio of more than 4:1, or 5:1 over the compression range, a linear characteristic for the valve over a speed range of more than 2:1 would be difficult to obtain.

Three embodiments of the invention are illustrated in axial section in the accompanying drawings.

Referring to said drawings, the valve shown in FIG. 1 comprises a cylindrical valve body 10 which is mounted for rotation about its axis by means (not shown) and is formed with an axial blind-ended bore of two diameters, the larger diameter portion of said bore being remote from the blind end and constituting a housing for a variable rate coil spring 11 which operates between an annular shoulder 12, afforded at the junction between two internal diameters of said bore, and an abutment disc 13 which is operated upon by the lever arms 14 of two diametrically opposed governor weights 15 pivotally connected, for radial outward movement at 16, to lugs 17 on the open or right-hand end of said rotary valve body 10. The abutment disc 13 is carried by the right-hand end of a plunger 18 which is encircled by the spring 11 and which, at its left-hand end, is formed with a head 19 which has an all round clearance in the right-hand end of the smaller diameter portion of said bore and affords an annular seating shoulder 20 for one end of a second coil spring 21 the other end of which engages a similar seating on a piston type valve element 22 which is slidable in said smaller diameter bore. The chamber afforded between the valve element 22 and the blind end of the bore constitutes a transfer chamber which is connected by an inlet port 23 to the pressure supply line (not shown) to be controlled and by an outlet port 24 to a reservoir (not shown) from which a delivery pump (not shown) draws its fluid supply to said line.

The valve is shown in the wholly unpressurised condition with the valve element 22 completely closing the outlet port 24. When the delivery pump is started up, its delivery pressure is sufficient to overcome the loading of the spring 21 and cause the valve element 22 to open fully the outlet port 24 so that fluid delivered to the transfer chamber passes therethrough to said reservoir. If now the valve body 10 is driven in rotation at progressively increasing speed, the governor weights 15 come into action to overcome the spring 11, at a rate proportional to variation in rotational speed, and to correspondingly deflect the spring 21 so that it moves the valve element or piston 22 to progressively restrict said outlet port 24 and cause the pressure in the supply line to build up correspondingly, full line pressure being attained when the outlet port 24 is completely closed by the piston 22. End stops 25 and 26 are provided on the piston 22 and the head 19 of the plunger 18 respectively to limit the travel of the piston 22 and of the plunger 18 under the action of the counter weights 15, thereby preventing overloading of the springs 11 and 21.

The embodiment shown in FIG. 2 is similar to that in FIG. 1, except that the valve element 22 is a ball which controls an axial inlet port $23^x$ instead of the radial outlet port 24.

The embodiment shown in FIG. 3 is similar to that in FIG. 1, except for an axial extension $10^x$ of the valve body, which extension $10^x$ constitutes a housing for a third coil spring 27 which operates upon the levers 14 of the counter-weights 15 and in opposition to the spring 11. This third spring 27 is provided to give more scope in designing the valve and enables linear or near linear characteristics to be achieved over a wider range of rotational speeds. A ball type valve, as in FIG. 2, may be used in this embodiment instead of the piston valve 22.

The second spring in FIG. 1 or FIG. 2 may be either of constant or vairable rate to suit design requirements, as may also the second or third spring, or both, in the FIG. 3 arrangement.

The invention has the advantages that it provides simple centrifugal type valves for obtaining linear or near linear speed-pressure characteristics that are substantially independent of temperature variations or changes in viscosity of the fluid supply, and without having to raise the delivery pressure of the auxiliary pump. Moreover, as applied to a vehicle hydrostatic transmisison of the kind herein before referred to the invention provides for a smooth and gradual take-up of the vehicle drive.

Having fully described my invention, what I claim and desire to secure by Letters Patent is:

1. In a centrifugal type fluid pressure relief valve of the type in which rotating weight means act upon a variable rate spring such that its deflection, due to the centrifugal force on said weight means, is proportional to the rotational speed of the latter, the improvement which comprises a valve closure element normally subjected to fluid pressure for moving said element toward open position, and means for moving said element toward closed position with a force substantially directly proportional to the rotational speed of said weight means, comprising a connection between the weight means and the valve closure element, said connection including a second spring.

2. The construction of claim 1 wherein the variable rate spring is heavier than the second spring.

3. The construction of claim 2 wherein the second spring is of constant rate.

4. The construction of claim 2 wherein the second spring is of variable rate.

5. The construction of claim 1 which includes in addition, a third spring acting on said weight means in opposition to said variable rate spring.

References Cited in the file of this patent
UNITED STATES PATENTS

| | | |
|---|---|---|
| 1,096,386 | Norton | May 12, 1914 |
| 1,600,507 | Marr | Sept. 21, 1926 |
| 2,117,891 | Kalin | May 17, 1938 |
| 2,385,201 | Gottlieb | Sept. 18, 1945 |
| 2,533,231 | Drake | Dec. 12, 1950 |
| 2,893,363 | Bettoni | July 7, 1959 |